Aug. 3, 1926.
C. H. GLOVER
1,594,414
ARTIFICIAL CHRISTMAS TREE
Filed August 8, 1925
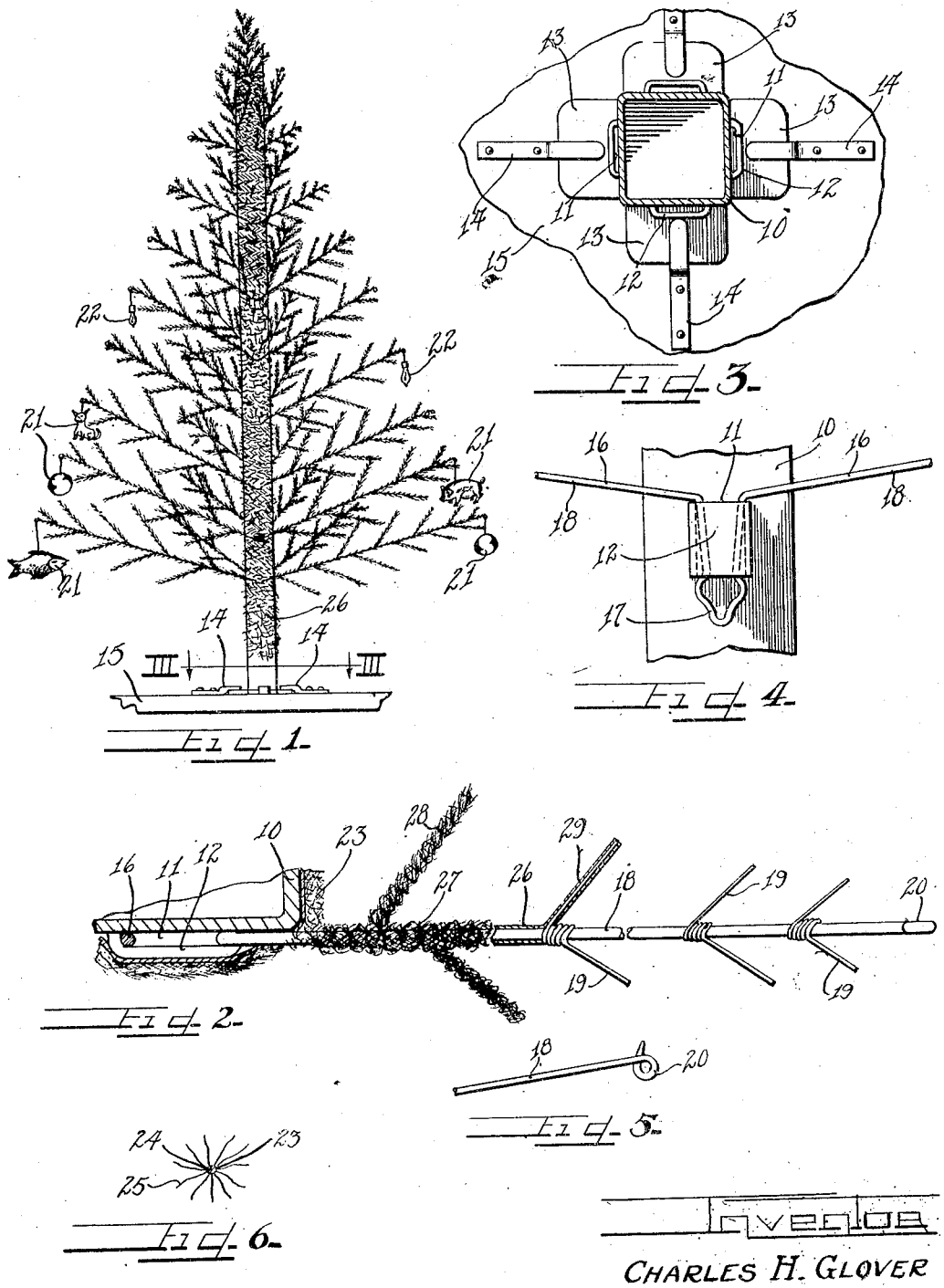
CHARLES H. GLOVER Patented Aug. 3, 1926.

1,594,414

UNITED STATES PATENT OFFICE.

CHARLES H. GLOVER, OF CHICAGO, ILLINOIS.

ARTIFICIAL CHRISTMAS TREE.

Application filed August 8, 1925. Serial No. 48,924.

The invention relates to improvements in Christmas trees.

One of the objects of the invention is to provide an artificial, ornamental Christmas tree.

Another object is to provide a knocked-down tree, comprising a central bole and separable, attachable branches.

A further object is to provide a tree made of a decorated metal frame, the parts of which may be separated and compacted into small compass for storage, or shipment.

Another object is to provide a tree of the character described, which can be made at low cost, the parts of which may be easily and quickly assembled, and separated, and which has the appearance of a natural decorated tree.

A still further object is to provide an ornamental, artificial tree, which is fireproof, thus eliminating danger of conflagration.

Another object is to provide a tree, which will not shed any of its parts, as the natural tree, and litter up a room in which it is placed, but which is tidy and sanitary.

Other objects, advantages and benfits will readily appear to persons skilled in the art from the consideration of the following description, in conjunction with the accompanying drawing forming a part thereof.

On the drawings:

Figure 1 is an elevation of the tree.

Figure 2 is an enlarged section through parts of the bole of the tree showing one of the radially extending branches.

Figure 3 is an enlarged transverse sectional view taken on line III—III of Figure 1.

Figure 4 is a side elevation of a fragment of the bole of the tree showing one manner of attaching the branches thereto.

Figure 5 is a fragment of the outer end of one of the branches showing a terminal eye, or hook, upon which to hang ornaments.

Figure 6 is a transverse section of a tinsel cord used to decorate the tree.

In all the views the same reference characters indicate similar parts.

As shown on the drawings:

The preferred form of the tree consists of a bole 10, rectangular in cross section, shown in Figure 3, and made preferably of sheet metal, or a metal tube. For convenience of manufacture, pockets 11 may be formed in the side surfaces of the bole by pressing out small parts 12 of the hole at intervals, more clearly shown in Figure 3.

The bole 10 may be provided with out turned feet 13, which constitute parts of the side surfaces of the bole, or tube before the feet were turned out. Clips 14 may be secured to a suitable base 15 to overlie the feet 13. The clips 14 are placed in positions, so that when the bole 10 is rotated to permit the feet to lie between the clips, then the bole may be removed from its support.

The tree is provided with a plurality of branches 16 more clearly shown in Figure 2. These branches may be connected together as at 17, or they may be separate as desired. In the latter event, the pockets 11 will be made correspondingly smaller. The object is to be able to readily assemble the parts and to take them apart.

The branches 16 may be made of relatively heavy wire 18, and relatively smaller wire 19 may be used to constitute the twigs, which are part of the branches. The wires 18, may be bent upwardly as shown in Figure 1 and they may be graduated in length if desired. They also may bear the twigs 19, or not, to suit the fancy of the manufacturer. On the end of each branch, is an eye, or hook 20 upon which ornaments 21 may be suspended and by which electric lights 22 may be held in positions.

In Figure 6 I have shown the cross-section of the tinseled strand 23. The tinseled strand is made of the tinseled cord 24, and radiating glistening little films 25. Each of the films is about from one-half to three-quarters of an inch long, on each side, making the entire tinsel about one inch and a half in diameter. The tinsel strand is wound upon the bole 10, as at 26, and upon the branches 16, as in 27, and also on the twigs, as in 28.

Before winding the tinsel strand on the branches, or upon the bole, I prefer to cover the metal portions with spirally wound crepe paper, either brown or green, as at 29. Instead of the crepe paper, however, the metal parts may be colored by painting suitable colors. Two branches 16, may be united at the bole and radiate therefrom, or the branches 16 may be made singly. When there are two made together, they may be formed in a straight line with respect to each other during the process of manufacture and then bent into any position desired after they have been placed upon the bole 10.

In placing the branches in position, the two parts of the loop 17 are pressed together, so that the loop will conveniently slip into the pockets 11, formed in the sides of the bole.

Tinsel having a silver sheen may be employed, or tinsel that has a metal sheen and a green cast produces a beautiful effect. When the light shines upon this tensil it scintillates like diamonds and produces a very attractive tree.

After the tree has been employed for its useful purpose and the ornaments and electric lights have been removed therefrom, the branches may then be taken from the bole, and bent back into straight lines, and placed side by side in a suitable container, of which the base 15, shown in Figure 3 may form a part. The bole 10 may also be placed in the same container and the tree may be stored until required for subsequent, similar use, after which it may again be assembled, in like manner and will be as beautiful as before and an appreciated novelty. The tree is entirely fire-proof and the tinsel and ornamental parts cannot be shook from the tree while in use.

Instead of making the bole rectangular, as shown, it may be octagonal, or round, as desired, and instead of making it of sheet metal, it may be formed of any other suitable material. One of the features of the invention, being the ease with which the parts may be disassembled and the small compass in which they may be packed for storage, or shipment.

I am aware that many changes may be made, and numerous details of construction may be varied through a wide range without departing from the principles of this invention. and I therefore do not purpose limiting the patent granted hereon, otherwise than necessitated by the prior art.

I claim as my invention:

1. A Christmas tree, comprising a metallic bole having pockets formed therein and wire branches having loop portions intermediate the ends thereof adapted to be resiliently retained in said pockets.

2. A Christmas tree, comprising a metallic bole formed of sheet metal having pockets stamped therefrom, wire branches adapted to be removably secured in said pockets and separable wire twigs for said branches.

In testimony whereof I have hereunto subscribed my name.

CHARLES H. GLOVER.